(12) United States Patent
Williams

(10) Patent No.: US 9,762,339 B2
(45) Date of Patent: Sep. 12, 2017

(54) TERRESTRIAL RADIO SWITCH MANAGER FOR SMART CELLULAR STREAMING

(71) Applicant: Panasonic Automotive Systems Company of America, Division of Panasonic Corporation of North America, Peachtree City, GA (US)

(72) Inventor: Eric Williams, Atlanta, GA (US)

(73) Assignee: Panasonic Automotive Systems Company of North America, Division of Panasonic Corporation of North America, Peachtree City, GA (US)

( * ) Notice: Subject to any disclaimer, the term of this patent is extended or adjusted under 35 U.S.C. 154(b) by 0 days.

(21) Appl. No.: 15/214,305

(22) Filed: Jul. 19, 2016

(65) Prior Publication Data

US 2016/0329977 A1    Nov. 10, 2016

Related U.S. Application Data

(63) Continuation-in-part of application No. 15/050,937, filed on Feb. 23, 2016, which is a continuation of application No. 14/177,795, filed on Feb. 11, 2014, now Pat. No. 9,306,688.

(51) Int. Cl.
| | |
|---|---|
| *H04W 36/24* | (2009.01) |
| *H04B 1/18* | (2006.01) |
| *H04H 60/41* | (2008.01) |
| *H04H 60/47* | (2008.01) |
| *H04W 36/30* | (2009.01) |
| *H04W 36/32* | (2009.01) |
| *H04H 20/57* | (2008.01) |

(52) U.S. Cl.
CPC ............ *H04H 60/41* (2013.01); *H04H 20/57* (2013.01); *H04H 60/47* (2013.01); *H04W 36/30* (2013.01); *H04W 36/32* (2013.01)

(58) Field of Classification Search
CPC ..................... H04B 1/18; H04H 60/35; H04H 60/47–60/52; H04H 60/41; H04H 60/42; H04H 60/44; H04W 36/24; H04W 36/30; H04W 36/32
See application file for complete search history.

(56) References Cited

U.S. PATENT DOCUMENTS

| | | | | |
|---|---|---|---|---|
| 5,842,119 A * | 11/1998 | Emerson | ............... | H04B 1/1027 455/154.2 |
| 6,725,022 B1 * | 4/2004 | Clayton | ............... | G01C 21/362 455/150.1 |
| 7,650,111 B2 * | 1/2010 | Dennisson | ............. | H04H 20/02 370/352 |

(Continued)

*Primary Examiner* — Blane Jackson
(74) *Attorney, Agent, or Firm* — Laurence S. Roach, Esq.

(57) ABSTRACT

A radio tuning method for a vehicle includes sensing that the vehicle is traveling out of a terrestrial broadcast range of a radio station that a radio of the vehicle is currently tuned to. The radio station broadcasts first content. An internet location streaming second content that is substantially similar to the first content broadcasted by the radio station is identified. An estimated period of time remaining until the vehicle exits the terrestrial broadcast range of the first radio station is indicated to the user. A user of the vehicle is provided with an option to switch tuning of the radio from the radio station to the internet location that is streaming the second content.

11 Claims, 10 Drawing Sheets

(56) References Cited

U.S. PATENT DOCUMENTS

| | | | | |
|---|---|---|---|---|
| 7,747,232 B2* | 6/2010 | Gierl | .................... | H03J 1/0083 |
| | | | | 455/132 |
| 9,473,802 B2* | 10/2016 | Naik Raikar | .... | H04N 21/44209 |
| 9,565,625 B1* | 2/2017 | MacNeille | ............ | H04W 48/18 |
| 2008/0064325 A1* | 3/2008 | Bates | .................... | H04H 60/74 |
| | | | | 455/3.02 |
| 2009/0097530 A1* | 4/2009 | Dhodapkar | ............ | H04H 60/43 |
| | | | | 375/131 |
| 2009/0264149 A1* | 10/2009 | Miller | .................... | H04H 60/13 |
| | | | | 455/552.1 |
| 2010/0285732 A1* | 11/2010 | Sinton | .................... | H04H 20/62 |
| | | | | 455/3.01 |
| 2015/0011163 A1* | 1/2015 | Brazerol | ................ | H04H 60/51 |
| | | | | 455/41.2 |

* cited by examiner

| Station | GPS location | Range Radius | Genre #1 | Genre #1 weight | Genre #2 | Genre #2 weight |
|---|---|---|---|---|---|---|
| 94.5 | 12.345, -98.765 | 100 miles | Pop | 70% | Rock | 30% |
| 98.3 | 15.45, -80.23 | 75 miles | R&B | 60% | Urban | 40% |

FIG. 3

| Station | FM Signal Strength | Genre #1 | Genre #1 weight | Genre #2 | Genre #2 weight |
|---|---|---|---|---|---|
| 94.5 | 80% | Pop | 70% | Rock | 30% |
| 98.3 | 60% | R&B | 60% | Urban | 40% |

FIG. 4

| FM Station Broadcast Frequency | GPS Location | Range Radius | Corresponding Streaming URL |
|---|---|---|---|
| 94.5 MHz | 12.345, -48.765 | 100 miles | 94-5.com/?Streaming |
| 98.3 MHz | 15.45, -80.23 | 75 miles | 98-3.com/?Streaming |

FIG. 10

| FM Station Broadcast Frequency | How Long in Range | Current FM Signal Strength | Primary Genre (#1) |
|---|---|---|---|
| 94.5 MHz | 50 miles | 80% | Pop |
| 98.3 MHz | 50 miles | 50% | R&B |
| 102.5 MHz | 70 miles | 50% | Rock |

FIG. 11

TERRESTRIAL RADIO SWITCH MANAGER FOR SMART CELLULAR STREAMING

CROSS-REFERENCE RELATION APPLICATION

This is a continuation-in-part of U.S. patent application Ser. No. 15/050,937, filed on Feb. 23, 2016, which is a continuation of U.S. patent application Ser. No. 14/177,795, filed on Feb. 11, 2014, now U.S. Pat. No. 9,306,688, issued on Apr. 5, 2016, the disclosures of which are hereby incorporated by reference in their entireties for all purposes.

BACKGROUND OF THE INVENTION

1. Field of the Invention

The present invention relates to a method of tuning to a new radio station when a user's vehicle travels out of the broadcast range of a currently-tuned radio station.

2. Description of the Related Art

When a driver of a motor vehicle travels out of the broadcast range of a radio station he is listening to, the driver must initiate a scan of available frequencies by pressing a scan button. Once the driver finds a station that is similar to the station he is currently listening to, he must then again operate the scan button in order to stop the scanning and select the new station as the frequency that the radio should be tuned to. A problem is that the operation of the scan button and selecting a new station diverts the driver's attention from the driving task.

As the connected car becomes commonplace, people will listen to a combination of streaming content that is distributed over the internet and terrestrial radio. There will be times when internet service is not available (or the user's data plan is running low), and there will be times when terrestrial stations are out of range. When either service is not available, the user does not have an easy way to switch over to the other service, thereby causing disappointment and distracted driving.

SUMMARY OF THE INVENTION

The invention may provide a smart automotive FM/AM auto-scanner which, as the vehicle moves out of reception range of a currently-tuned radio station, may automatically (e.g., without user intervention) scan frequencies and find an FM/AM station that is most similar to the currently-tuned station. As used herein, stations may be "similar" in that they broadcast the same genre of music or talk. Thus, if the vehicle is traveling out of the broadcast range of a currently-tuned to jazz station, then the radio may automatically find another jazz station that is within reception range of the radio.

In another embodiment, the invention includes automatically displaying a list of receivable stations that are most similar to the currently-tuned station that is moving out of range. The receivable stations may be ordered in the list from most similar to least similar to the currently-tuned station. The user may be enabled to select and listen to each of the receivable stations on the list.

In yet another embodiment, if the station going out of reception range is broadcasting a syndicated program, then the invention includes offering to, or automatically, switching tuning to another station on which the same syndicated program is being broadcast.

In a further embodiment, the invention may provide a smart switching method between terrestrial content and streaming/cellular content. There are many times when the same programming content is available on both mediums, terrestrial and cellular, but current systems are not smart enough to know when to use which medium. For instance, assume the user is listening to the artist Tom Joyner over terrestrial radio (FM) and the user is traveling out of reception range. If the user has an internet connection, then a smart system of the invention can seamlessly and without interruption switch tuning to the same internet station via streaming/cellular radio.

As another example, assume the user is streaming music by Tom Joyner but the internet connection is poor or the user is running out of available data on his data plan, making further streaming prohibitively expensive. If the streaming/cellular radio station that the user is currently accessing is available over terrestrial (FM) radio, then the inventive smart system can automatically switch tuning to terrestrial radio. In general, the inventive system may employ terrestrial radio when it is possible and practical, because terrestrial radio is faster and less limited as compared to internet streaming.

The invention comprises, in one form thereof, a radio tuning method for a vehicle, including sensing that the vehicle is traveling out of a first broadcast range of a first radio station that a radio of the vehicle is currently tuned to. The first radio station broadcasts first content. A second radio station is identified having a second broadcast range that the vehicle will be in when the vehicle is no longer in the first broadcast range. The identifying includes determining that the second radio station broadcasts second content that is substantially similar to the first content broadcasted by the first radio station. A user of the vehicle is provided with an option to switch tuning of the radio from the first radio station to the second radio station.

The invention comprises, in another form thereof, a radio tuning method for a vehicle, including sensing that the vehicle is traveling out of a first broadcast range of a first radio station. The first radio station broadcasts first content. A second radio station is identified having a second broadcast range that the vehicle will be in when the vehicle is no longer in the first broadcast range. The second radio station broadcasts second content substantially similar to the first content broadcasted by the first radio station. The identifying includes querying a database of radio stations. The database specifies respective content broadcasted by the radio stations in the database. A user of the vehicle is provided with an option to switch tuning of the radio from the first radio station to the second radio station.

The invention comprises, in yet another form thereof, a radio tuning method for a vehicle, including sensing that the vehicle is traveling out of a first broadcast range of a first radio station. The first radio station broadcasts first content. A second radio station is identified broadcasting second content that is substantially similar to the first content broadcasted by the first radio station. The identifying includes reading the metadata (RDS) in the broadcast of the second content. A user of the vehicle is provided with an option to switch tuning of the radio from the first radio station to the second radio station.

The invention comprises, in still another form thereof, a radio tuning method for a vehicle, including sensing that the vehicle is traveling out of a terrestrial broadcast range of a radio station that a radio of the vehicle is currently tuned to. The radio station broadcasts first content. An internet location (e.g., url) streaming second content that is substantially similar to the first content broadcasted by the radio station is identified. An estimated period of time remaining until the vehicle exits the terrestrial broadcast range of the first radio station is indicated to the user. A user of the vehicle is provided with an option to switch tuning of the radio from the radio station to the interact location that is streaming the second content.

The invention comprises, in a further form thereof, a radio tuning method for a vehicle, including sensing that the vehicle is traveling out of communication range of a cellular tower through which an audio system of the vehicle is receiving streaming radio content. A terrestrial radio station broadcasting terrestrial radio content that is substantially similar to the streaming radio content is identified. A user of the vehicle is provided with an option to switch tuning of the radio from the streaming radio content to the terrestrial radio content.

The invention comprises, in a still further form thereof, a radio tuning method for a vehicle, including using an audio system of the vehicle to receive streaming radio content via the internet. It is sensed that the vehicle is at least close to exceeding a user's allotted data usage. A terrestrial radio station broadcasting terrestrial radio content that is substantially similar to the streaming radio content is identified. A user of the vehicle is provided with an option to switch tuning of the radio from the streaming radio content to the terrestrial radio content.

An advantage of the present invention is that it may reduce driver distraction. The invention may eliminate the need for the driver to direct his attention to the radio to perform a scan when the radio station is no longer within reception range. Also eliminated may be the need for the driver to be attentive to the scanned stations so that the driver knows when to stop the scan.

Another advantage of the present invention is that it may avoid the situation in which the driver performs a scan when a particular radio station is playing a commercial, and then the driver cannot ascertain that the particular station is a desirable station. The present invention may also avoid the situation in which the driver performs a scan and stops the scan at a selected similar station, but the selected station is not the most similar station that is within broadcast range.

BRIEF DESCRIPTION OF THE DRAWINGS

The above-mentioned and other features and objects of this invention, and the manner of attaining them, will become more apparent and the invention itself will be better understood by reference to the following description of embodiments of the invention taken in conjunction with the accompanying drawings, wherein:

FIG. 3 illustrates an example database of the invention.

FIG. 4 illustrates another example database of the invention.

FIG. 10 illustrates yet another example database of the invention.

FIG. 11 illustrates a further example database of the invention.

DETAILED DESCRIPTION

The embodiments hereinafter disclosed are not intended to be exhaustive or limit the invention to the precise forms disclosed in the following description. Rather the embodiments are chosen and described so that others skilled in the art may utilize its teachings.

Figure 1:
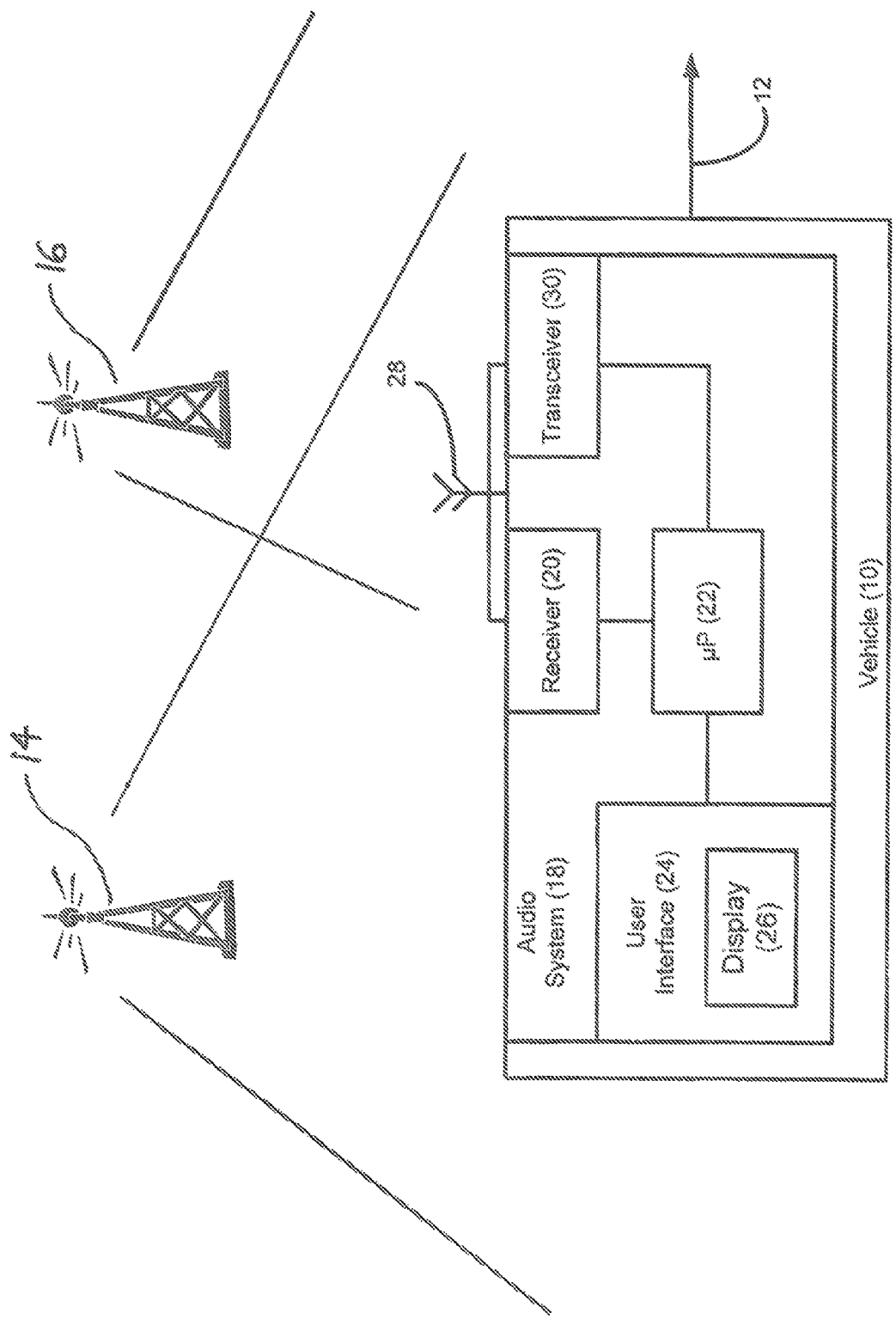
FIG. 1 is a schematic diagram illustrating one embodiment of a smart FM/AM auto-scanning method of the present invention.

Referring now to the drawings, and particularly to FIG. 1, there is shown a vehicle 10 moving in direction 12. As vehicle 10 continues to move in direction 12, vehicle 10 may move farther away from first radio station 14, and thus may move out of the reception range of first radio station 14. Also as vehicle 10 continues to move in direction 12, vehicle 10 may move closer to a second radio station 16, and thus may move into the reception range of second radio station 16. Second radio station 16 may be similar to first radio station 14 in that stations 14 and 16 broadcast the same genre of music or the same genre of task.

Vehicle 10 may include an audio system 18 having a radio receiver 20 communicatively coupled to a microprocessor 22 which, in turn, is communicatively coupled to a user interface 24. User interface 24 may include a display 26 with a touch screen that a user may use to make selections of options presented on display 26. Receiver 20 may receive radio signals via antenna 28.

As vehicle 10 leaves the broadcast range of first station 14, audio system 18 may sense that the strength of the signal from station 14 is getting lower. In response to sensing the weakening of the signal from station 14, audio system 18 may identify second station 16 as being similar to station 14. Audio system 18 may include a transceiver 30 including a second receiver for background frequency searching and identification of similar stations. After sensing that first station 14 is getting out of range and identifying similar station 16, audio system 18 may present on display 26 a message such as "Your current station is going out of range. I've found a similar station in range . . . Switch?". Audio system 18 may also present on display 26 a first touch button labeled "Yes", and a second touch button labeled "No" with which the user may answer the question about switching. Alternatively, after sensing that first station 14 is getting out of range and identifying the three most similar stations, audio system 18 may present on display 26 a message such as "Your current station is going out of range. Here are the top 3 most similar stations in range". In one embodiment, this message may be an audible message instead of a visible message. Audio system 18 may also present on display 26 three touch buttons each labeled with the frequency and/or call letters of a respective one of the three most similar stations. Below each of the touch buttons may be displayed the name of the artist and/or song that is currently playing on that station. By touching one of the touch buttons, the user may switch tuning to the respective similar station.

Figure 2:
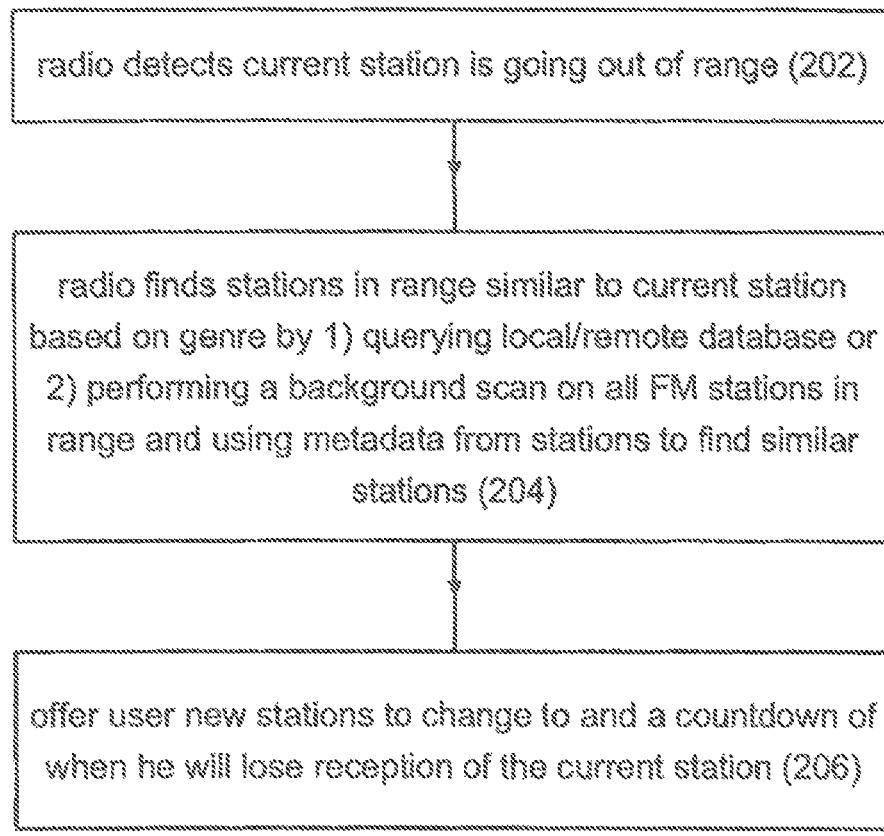
FIG. 2 is a flow chart illustrating another embodiment of a smart FM/AM auto-scanning method of the present invention.

Another embodiment of a smart FM/AM auto-scanning method 200 of the present invention is illustrated in the flow chart of FIG. 2. In a first step 202, a radio detects that a current station is going out of range. For example, audio system 18 may determine that vehicle 10 is moving out of the reception range of first station 14, perhaps by detecting that the signal being received from station 14 is weakening.

In a next step 204, the radio finds stations in range that are similar to the current station in terms of genre by querying a local/remote database, or by performing a background scan on all stations in range and using metadata from all stations in range. For example, audio system 18 may find the three stations that are most similar to the current station by such querying or by performing background scans.

Next, in step 206, the user may be offered new stations to change to, and a countdown to when the user will lose the current station. For example, identifications of the three most similar stations may be presented on display 26, with a selectable respective touch button being presented for each of the stations. Further, a countdown timer may present on display 26 the estimated time in minutes and seconds before the signal from the first station is no longer strong enough to be satisfactorily played on audio system 18.

In order to identify one or more stations that are similar to the current station, audio system 18 may refer to and pull information from a database that is located either locally on the radio or in the cloud. FIG. 3 illustrates an example of such a database of the invention. The weights may indicate what percentage of the station's programming is comprised of each genre of music.

In the event that the database is located in the cloud, the database may be dynamic and easily modified. Regardless, however, of whether the database is locally stored in the radio or in the cloud, audio system 18 may transmit the current GPS location of vehicle 10 and the genre of the currently tuned radio station to the database. If the database is in the cloud, transceiver 30 may be used to transmit this information. In response, the database may transmit to audio system 18 information identifying one or more stations that are in range of vehicle 10 and similar to the currently tuned station. Audio system 18 may then present the station-identifying information on display 26 for selection by the user, as described above.

In another embodiment, audio system 18 requests genre metadata from all stations in reception range. Transceiver 30 may be used for these requests. In response, the stations in reception range may return to audio system 18 the requested genre metadata. Audio system 18 may then take the received metadata and create a database (FIG. 4) of the received metadata. Audio system 18 may then present to the user the most similar stations, taking into account genre matching and the signal strength of the similar stations. The weights may indicate what percentage of the station's programming is comprised of each genre of music.

Figure 5:
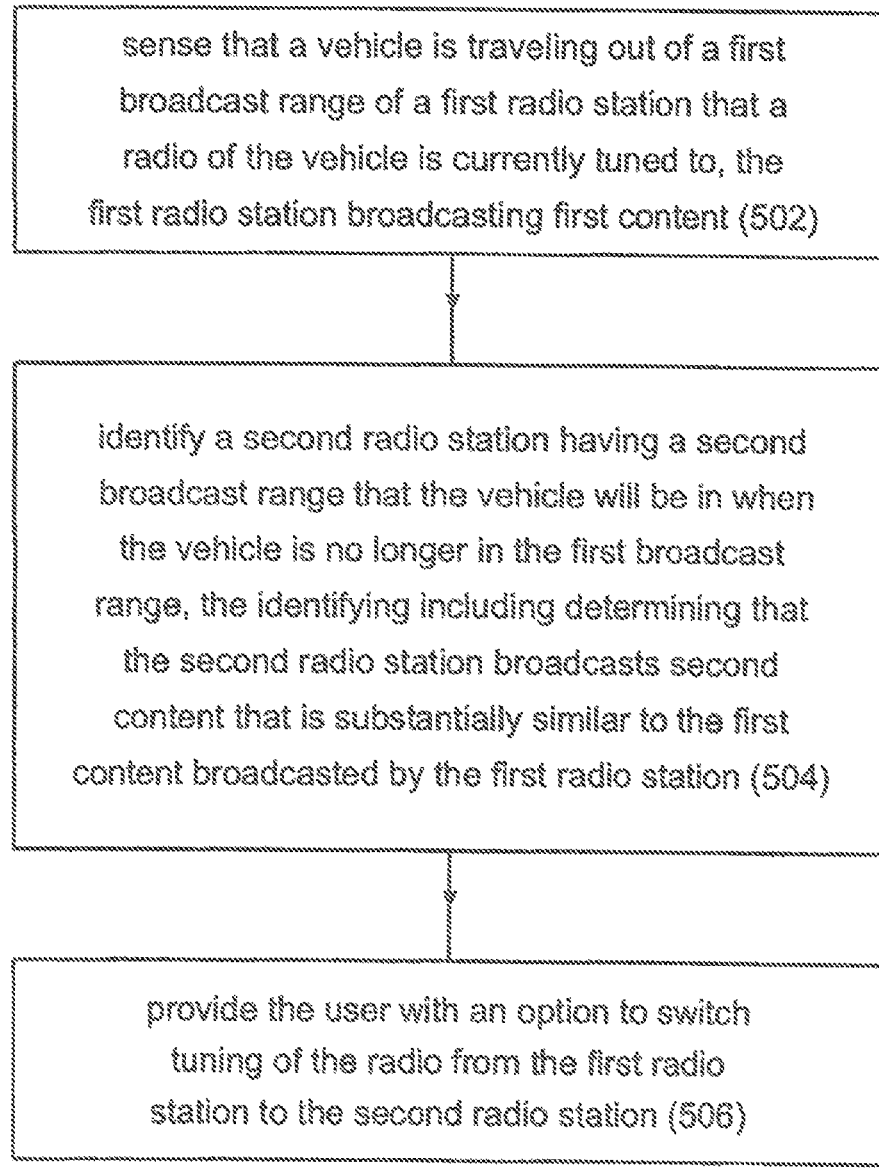
FIG. 5 is a flow chart illustrating yet another embodiment of a smart FM/AM auto-scanning method of the present invention.

Yet another embodiment of a smart FM/AM auto-scanning method 500 of the present invention is illustrated in the flow chart of FIG. 5. In a first step 502, it is sensed that a vehicle is traveling out of a first broadcast range of a first radio station that a radio of the vehicle is currently tuned to. The first radio station broadcasts first content. For example, audio system 18 may determine that vehicle 10 is moving out of the reception range of first station 14, perhaps by detecting that the signal being received from station 14 is weakening. Alternatively, audio system 18 may determine that vehicle 10 is moving out of the reception range of first station 14 by querying a database, such as the database shown in FIG. 3, to ascertain the broadcast range of first station 14. First station 14 may broadcast content of a certain genre of music or talk, or a certain combination of genres in a certain ratio.

In a next step 504, a second radio station is identified having a second broadcast range that the vehicle will be in when the vehicle is no longer in the first broadcast range. The identifying including determining that the second radio station broadcasts second content that is substantially similar to the first content broadcasted by the first radio station. For example, audio system 18 may find, of the stations that will be in broadcast range, a station that is most similar to the current station by querying a local or remote database, such as the database shown in FIG. 3. Alternatively, audio system 18 may perform a background scan to sample stations whose signals can be received. Audio system 18 may then populate a database, such as the database shown in FIG. 4, with data associated with the sampled stations to thereby ascertain which of the sampled stations both can be adequately received and broadcasts content that is most similar to the content of the currently tuned station.

In a final step 506, the user may be provided with an option to switch tuning of the radio from the first radio station to the second radio station. For example, a question such as "would you like to switch to a similar station?" may be presented on display 26, with a selectable touch button also being presented on display 26 for the user to provide an affirmative response.

Figure 6:
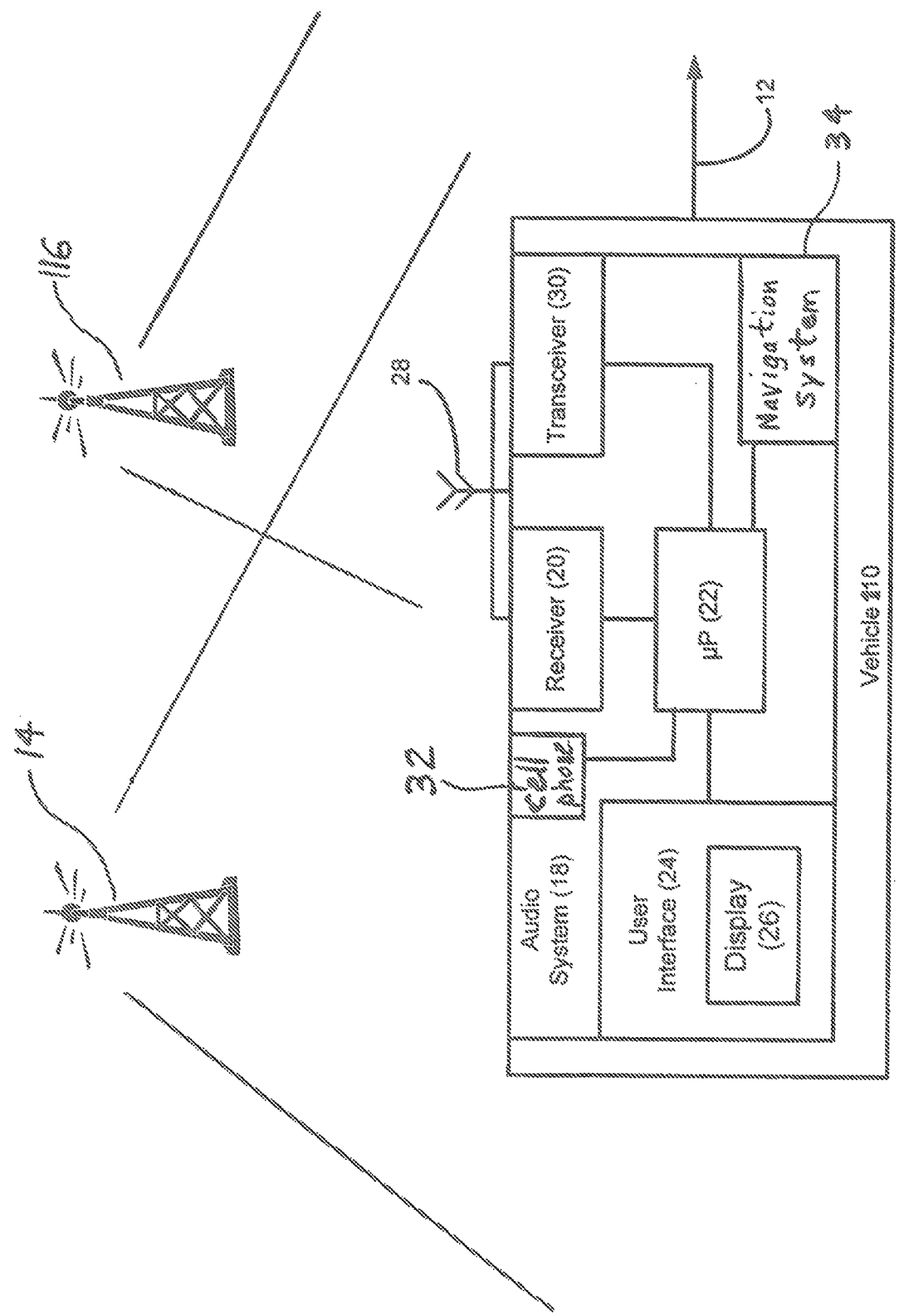
FIG. 6 is a schematic diagram illustrating still another embodiment of a smart FM/AM auto-scanning method of the present invention.

In another embodiment, the invention may provide a method of automatically switching between tuning to terrestrial AM/FM radio and accessing content via streaming on the internet or accessing content via cellular communication. FIG. 6 illustrates one embodiment of an inventive method of automatically switching between tuning to terrestrial radio and streaming/cellular radio. Vehicle 110 of FIG. 6 is structurally substantially similar to vehicle 10 except that vehicle 110 includes a device enabling cellular communication or internet access, which in this case is in the form of a cellular telephone 32. Cellular telephone 32 may be built into vehicle 110, or may be a mobile telephone this is carried by a human user of vehicle 110.

Vehicle 110 may also include a navigation system 34 which may be used to plan a route for vehicle 110. Processor 22 may calculate the distance between vehicle 110 and each of radio station 14 and cellular tower 116 along any point along the planned route.

As vehicle 110 continues to move in direction 12, vehicle 110 may move farther away from radio station 14, and thus may move out of the reception range of radio station 14. Also as vehicle 110 continues to move in direction 12, vehicle 110 may move closer to a cellular tower 116, and thus may move into the reception range of cellular tower 116. A variety of streaming radio stations may be accessible via cellular tower 116. The streaming radio stations accessible via cellular tower 116 may be similar to radio station 14 in that station 14 and the streaming radio stations broadcast the same genre of music or the same genre of talk.

As vehicle 110 leaves the broadcast range of station 14, audio system 18 may sense that the strength of the signal from station 14 is getting lower. In response to sensing the weakening of the signal from station 14, audio system 18 may identify a streaming station accessed via cellular tower 116 as being similar to station 14. After sensing that station 14 is getting out of range and identifying a similar station accessed via cellular tower 116, audio system 18 may present on display 26 a message such as "Your current station is going out of range. I've found the same or a similar station available over Internet . . . Switch?". Audio system 18 may also present on display 26 a first touch button labeled "Yes", and a second touch button labeled "No" with which the user may answer the question about switching. Alternatively, after sensing that first station 14 is getting out of range and identifying the three most similar stations available over the internet, audio system 18 may present on display 26 a message such as "Your current station is going out of range. Here are the top 3 most similar stations in range". In one embodiment, this message may be an audible message instead of a visible message. Audio system 18 may also present on display 26 three touch buttons each labeled with the frequency and/or call letters of a respective one of the three most similar stations. Below each of the touch buttons may be displayed the name of the artist and/or song that is currently playing on that station. By touching one of the touch buttons, the user may switch tuning to the respective similar station.

Figure 7:
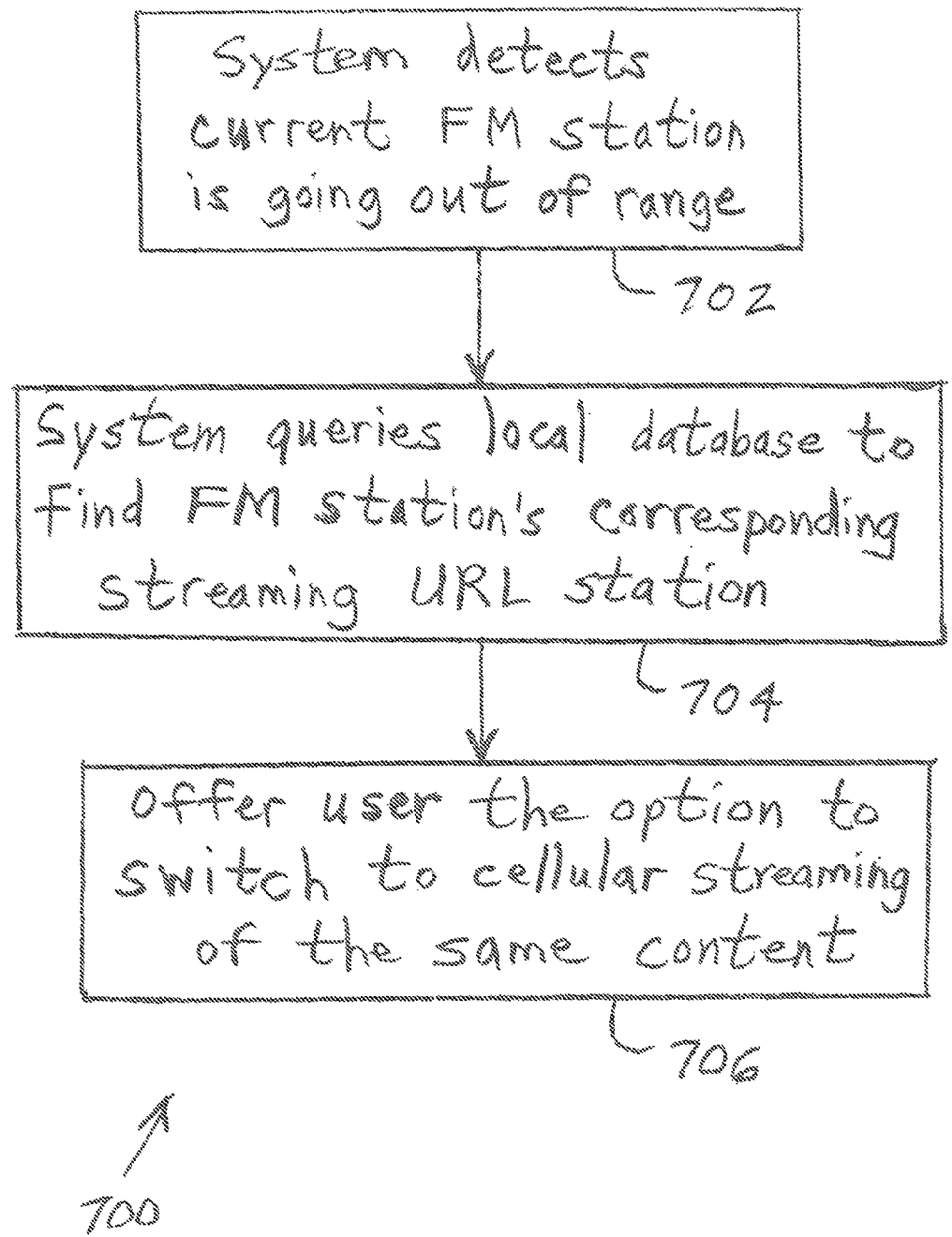
FIG. 7 is a flow chart illustrating a further embodiment of a smart FM/AM auto-scanning method of the present invention.

FIG. 7 illustrates a further embodiment of a smart FM/AM auto-scanning method 700 of the present invention. In a first step 702, the inventive system detects that the current FM station is going out of reception range. For example, audio system 18 may detect, based on received signal strength, that vehicle 110 can no longer adequately receive FM station 14 as vehicle 110 moves in direction 12. In a next step 704, the system queries a local database to find the FM station's corresponding streaming uniform resource locator (URL) station. For example, audio system 18 may access a lookup table stored within vehicle 110 which associates each FM station with a corresponding URL at which the streaming version of the FM station may be found. In a last step 706, the user is offered the option to switch to cellular streaming of the same content. That is, the user may be asked whether he would like to switch tuning from the FM station to the streaming version of the same FM station.

Figure 8:
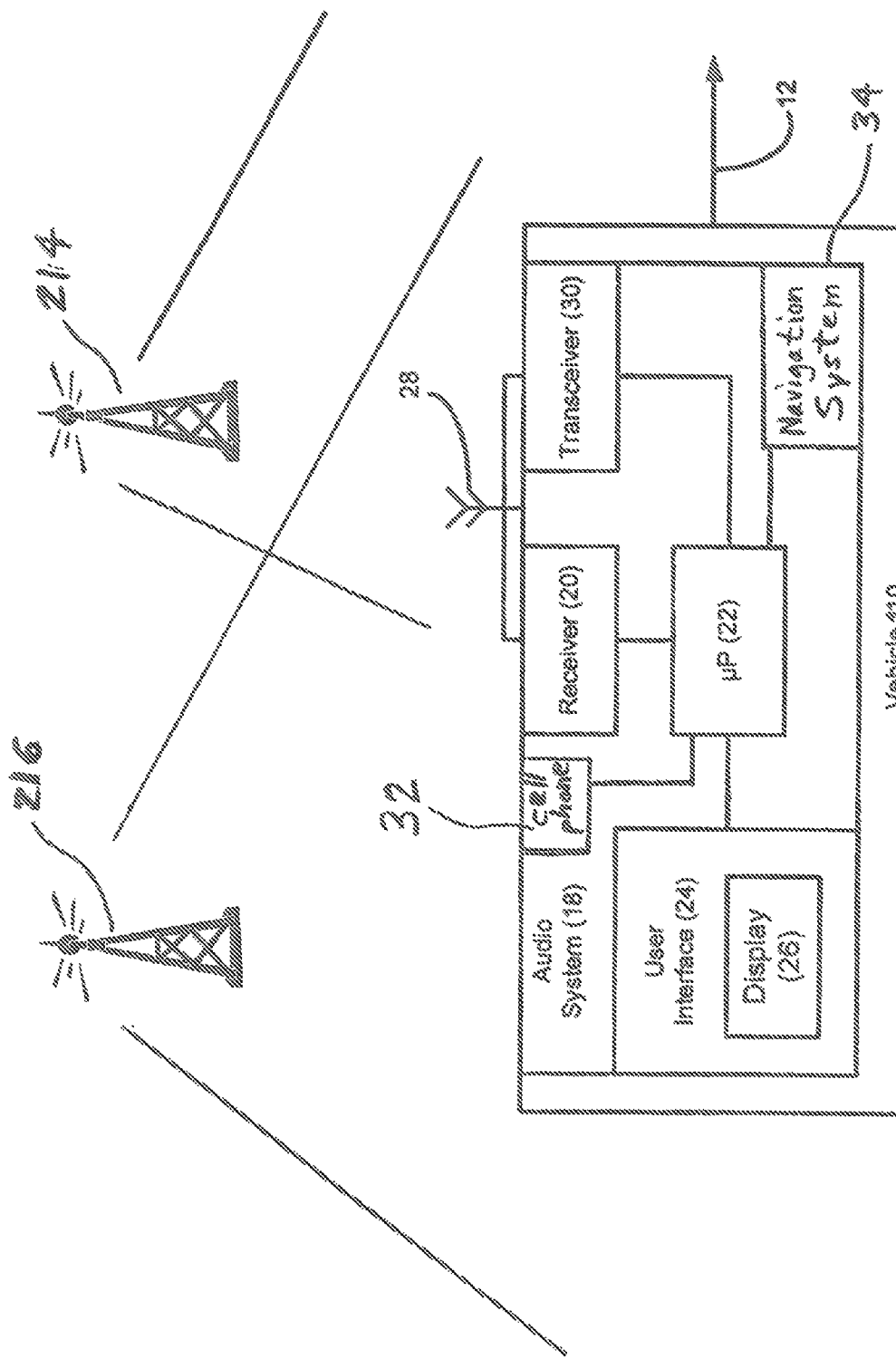
FIG. 8 is a schematic diagram illustrating another embodiment of a smart FM/AM auto-scanning method of the present invention.

FIG. 8 illustrates another embodiment of an inventive method of automatically switching between tuning to terrestrial radio and streaming/cellular radio. As vehicle 110 continues to move in direction 12, vehicle 110 may move farther away from cellular tower 216, and thus may move out of the reception range of cellular tower 216 and out of the range of 3G/4G service. Also as vehicle 110 continues to move in direction 12, vehicle 110 may move closer to a radio station 214, and thus may move into the reception range of station 214. Radio station 214 may be similar to the station currently being streamed via cellular tower 216 in that station 214 and the streamed radio station broadcast the same genre of music or the same genre of talk.

As vehicle 110 leaves the reception range of cellular tower 216, audio system 18 and/or cellular device 32 may sense that the strength of the signal from cellular tower 216 is getting lower. In response to sensing the weakening of the signal from cellular tower 216, audio system 18 may identify a terrestrial station 214 as being similar to the station currently being accessed via cellular tower 216. After sensing that cellular tower 216 is getting out of range and identifying a similar station 214, audio system 18 may present on display 26 a message such as "Your 3G/4G service is going out of range. I've found the same or a similar station available over terrestrial . . . Switch?". Another possible such message would be "You are over your data plan. I've found the same or a similar station available over terrestrial . . . Switch?". Audio system 18 may also present on display 26 a first touch button labeled "Yes", and a second touch button labeled "No" with which the user may answer the question about switching. Alternatively, after sensing that cellular tower 216 is getting out of range and identifying the three most similar terrestrial stations within reception range, audio system 18 may present on display 26 a message such as "Your 3G/4G service is going out of range and/or you are over your data plan. Here are the top 3 most similar terrestrial stations in range". In one embodiment, this message may be an audible message instead of a visible message. Audio system 18 may also present on display 26 three touch buttons each labeled with the frequency and/or call letters of a respective one of the three most similar stations. Below each of the touch buttons may be displayed the name of the artist and/or song that is currently playing on that station. By touching one of the touch buttons, the user may switch tuning to the respective similar station.

Figure 9:
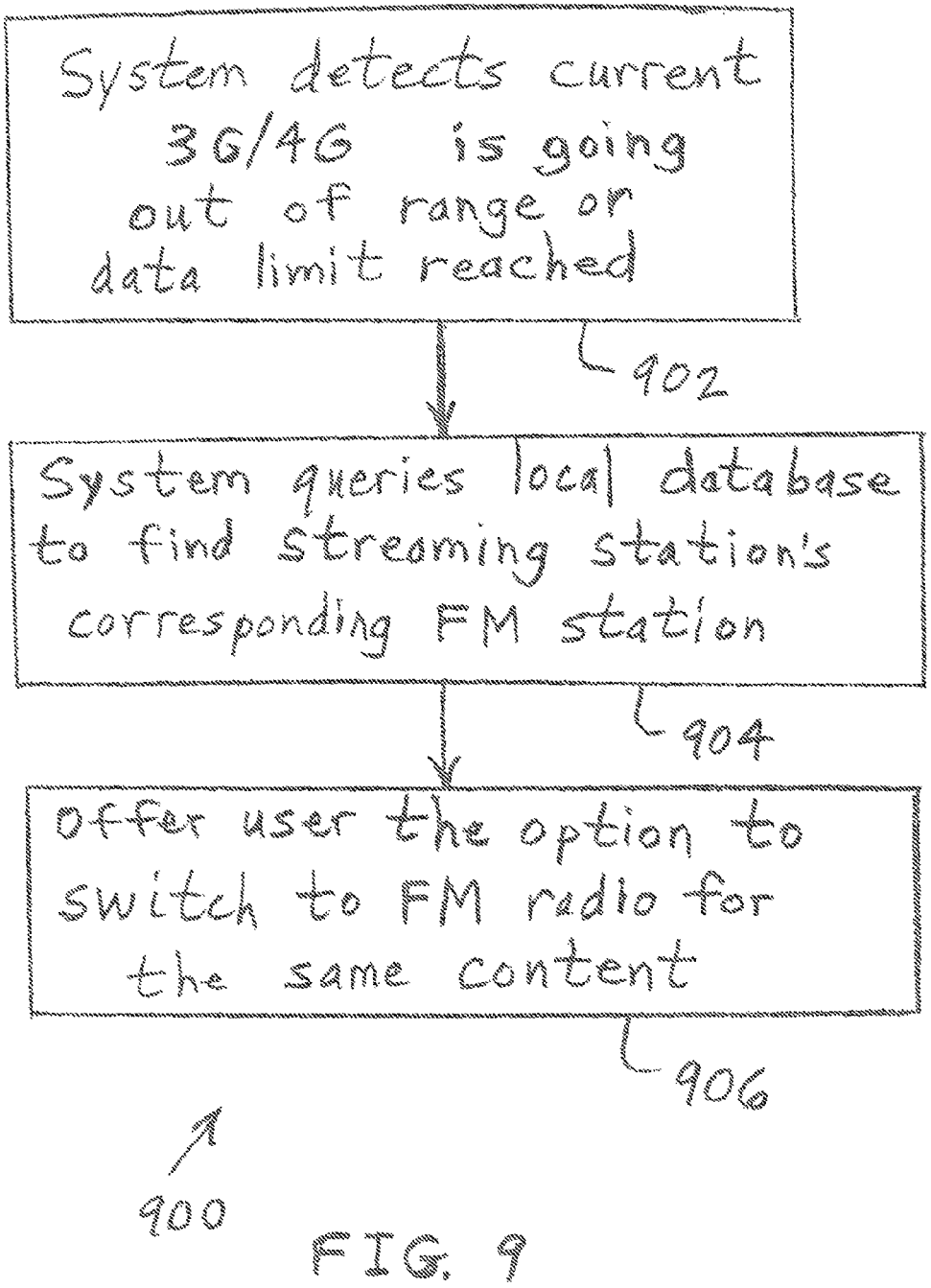
FIG. 9 is a schematic diagram illustrating another embodiment of a smart FM/AM auto-scanning method of the present invention.

FIG. 9 illustrates another embodiment of a smart FM/AM auto-scanning method 900 of the present invention, in a first step 902, the inventive system detects that the current 3G/4G service is going out of reception range or the user's data limit on his account with his service provider is close to being exceeded. For example, audio system 18 may detect, based on received signal strength, that vehicle 110 can no longer adequately receive signals from the streaming URL station via cellular tower 216 as vehicle 110 moves in direction 12. In a next step 904, the system queries a local database to find the streaming URL station's corresponding FM station. For example, audio system 18 may access a lookup table stored within vehicle 110 which associates each streaming URL station with a corresponding FM station and/or the FM station's broadcasting frequency, at which the same content may be found. In a last step 906, the user is offered the option to switch to tuning to the FM station for the same content. That is, the user may be asked whether he would like to switch tuning from the streaming version of the FM station to the terrestrial broadcast of the actual FM station itself.

As described above with respect to steps 704 and 904, a database that associates terrestrial radio stations with corresponding internet locations where the stations' content is streamed may be stored locally in the vehicle, and may be stored within the radio. The database may regularly and frequently synchronize with the cloud or internet to get the most up to date information. Alternatively, the database may be stored in the cloud. FIG. 10 illustrates an example of such a database of the invention. The local database of terrestrial stations and streaming URLs and their corresponding content may be synchronized over the internet regularly so that the database stays up to date. Whenever the internet is down or slow the inventive system may query the database to ascertain the corresponding terrestrial station and switch to the corresponding terrestrial station if the corresponding terrestrial station is available.

In another embodiment, instead of a database storing terrestrial radio station information, FM station content is derived on the fly from the call signals or in RDS/RBDS information carried by the FM signal. The RDS/RBDS information may carry the corresponding streaming url as well as metadata. The audio system may include a second tuner to collect the FM station content on the fly.

FIG. 11 illustrates another example database of the invention which may be employed when the vehicle includes a navigation system that stores a planned route of the vehicle. Because the inventive system knows the planned route of the vehicle, the system may determine that the station broadcasting at 102.5 MHz will be in reception range for the longest period of time and for the longest driving range. Therefore, the system can rank this recommendation of the station broadcasting at 102.5 MHz higher than the other stations, and may place this station at the top of the list as the first option.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. A radio tuning method for a vehicle, comprising the steps of:
   sensing that the vehicle is traveling out of a terrestrial broadcast range of a radio station that a radio of the vehicle is currently tuned to, the radio station broadcasting first content;
   identifying an internet location streaming second content that is substantially similar to the first content broadcasted by the radio station;
   providing a user of the vehicle with an option to switch tuning of the radio from the radio station to the internet location streaming the second content; and
   indicating to the user an estimated period of time remaining until the vehicle exits the terrestrial broadcast range of the radio station.

2. The method of claim 1 wherein the identifying step includes querying a database of radio stations and internet addresses, the database specifying respective types of content broadcasted by the radio stations and streamed by the internet locations.

3. The method of claim 1 wherein the indicating step includes providing a numerical indication to the user of an estimated period of time remaining until the vehicle exits the first broadcast range of the radio station.

4. The method of claim 1 wherein the second content is substantially identical to the first content broadcasted by the radio station.

5. The method of claim 1 wherein the internet location streaming the second content is accessed via a cellular tower.

6. The method of claim 1 wherein the identifying step includes reading metadata in the radio station broadcast, the metadata including an identification of the internet location streaming second content that is substantially similar to the first content broadcasted by the radio station.

7. A radio tuning method for a vehicle, comprising the steps of:
   sensing that the vehicle is traveling out of a terrestrial broadcast range of a radio station that a radio of the vehicle is currently tuned to, the radio station broadcasting first content, wherein the sensing step includes querying a database of radio stations, the database including information indicating a broadcast range of the radio station;
   identifying an internet location streaming second content that is substantially similar to the first content broadcasted by the radio station; and
   providing a user of the vehicle with an option to switch tuning of the radio from the radio station to the internet location streaming the second content.

8. A radio tuning method for a vehicle, comprising the steps of:
   sensing that the vehicle is traveling out of communication range of a cellular tower through which an audio system of the vehicle is receiving streaming radio content;
   identifying a terrestrial radio station broadcasting terrestrial radio content that is substantially similar to the streaming radio content;
   providing a user of the vehicle with an option to switch tuning of the radio from the streaming radio content to the terrestrial radio content; and
   presenting to the user a numerical indication of an estimated period of time remaining until the vehicle exits the communication range of the cellular tower.

9. The method of claim 8 wherein the identifying step includes querying a database of radio stations and internet addresses, the database specifying respective types of content broadcasted by the radio stations and streamed via the internet addresses.

10. A radio tuning method for a vehicle, comprising the steps of:
    sensing that the vehicle is traveling out of communication range of a cellular tower through which an audio system of the vehicle is receiving streaming radio content, wherein the sensing step includes querying a database of cellular towers, the database including information indicating a communication range of the cellular tower;
    identifying a terrestrial radio station broadcasting terrestrial radio content that is substantially similar to the streaming radio content; and
    providing a user of the vehicle with an option to switch tuning of the radio from the streaming radio content to the terrestrial radio content.

11. A radio tuning method for a vehicle, comprising the steps of:
    sensing that the vehicle is traveling out of communication range of a cellular tower through which an audio system of the vehicle is receiving streaming radio content;
    identifying a terrestrial radio station broadcasting terrestrial radio content that is substantially similar to the streaming radio content, wherein the identifying step includes querying a database of radio stations and internet addresses, the database specifying respective types of content broadcasted by the radio stations and streamed via the internet addresses wherein the database includes geographic coordinates of the radio stations in the database; and
    providing a user of the vehicle with an option to switch tuning of the radio from the streaming radio content to the terrestrial radio content.

* * * * *